United States Patent Office 3,409,683
Patented Nov. 5, 1968

3,409,683
STABILIZATION OF ALKYLIDENE-
BICYCLOHEPTENES
Samuel B. Britton, Charleston, W. Va., assignor to Union
Carbide Corporation, a corporation of New York
No Drawing. Filed June 7, 1967, Ser. No. 644,084
9 Claims. (Cl. 260—666.5)

ABSTRACT OF THE DISCLOSURE

Alkylidenebicycloheptenes are stabilized against polymerization and gum formation during storage by the addition thereto of a minor amount of a dihydroxybenzene derivative, such as the catechols and hydroquinones. The preferred inhibitor is tertiary butylcatechol. The alkylidenebicycloheptenes are used in the production of ethylene/propylene/termonomer elastomers.

---

This invention relates to new compositions of matter and particularly to new compositions comprising an alkylidenebicycloheptene and a minor stabilizing amount of an alkylcatechol, a hydroquinone, or a monoalkyl ether of hydroquinone.

The 5-alkylidenebicyclo[2.2.1]hept-2-enes of the general formula:

wherein R is the divalent alkylidene radical containing from 2 to about 10 carbon atoms and R' is hydrogen or alkyl of from 1 to about 10 carbon atoms, are well known and have been disclosed in U.S. Patent No. 3,151,173 together with the methods for their production. These compounds find use as termonomers in the production of elastomers with ethylene and propylene. Illustrative of the 5-alkylidenebicyclo[2.2.1]hept-2-enes one can mention 5 - ethylidenebicyclo[2.2.1]hept - 2 - ene, 5-ethylidene-6-ethylbicyclo[2.2.1]hept-2-ene, 5 - ethylidene-6 - decylbicyclo[2.2.1]hept - 2 - ene, 5-propylidenebicyclo[2.2.1]hept-2-ene, 5 - butylidenebicyclo[2.2.1]hept-2-ene, 5-butylidene-6-methylbicyclo[2.2.1]hept-2-ene, 5 - decylidenebicyclo[2.2.1]hept-2-ene, and the like.

However, on storage the alkylidenebicycloheptenes form a polymeric gum, particularly in the presence of air or iron oxides, whose presence is undesired when the monomers are used for the production of terpolymer elastomers. The removal of this gum involves an expensive, time consuming procedure.

It has now been found that 5-alkylidenebicyclo[2.2.1] hept-2-enes can be stabilized against oxidation by the incorporation therein of a small amount of a stabilizer as hereinafter defined. The amount of stabilizer required is not narrowly critical. It can be added to the alkylidenebicycloheptene in an amount of from about 50 p.p.m. to about 2,500 p.p.m. or more. The preferred concentration is from about 100 to about 500 p.p.m., with concentrations from about 100 to about 250 p.p.m. more preferred since at such concentrations the stabilizer need not be removed from the mixture prior to use of the alkylidenebicycloheptene. Any amount can be used provided it is a stabilizing amount and it can be added by conventional procedures of mixing and dissolving.

The stabilizers that can be used are: (i) the alkylcatechols containing from 1 to about 8 carbon atoms in the alkyl chain, such as 4-methylcatechol, 4-tertiary butylcatechol, 4-(2-ethylhexyl)catechol, 3,5-ditertiary butylcatechol, and the like; (ii) the hydroquinones containing up to about 8 carbon atoms in the alkyl chain, such as hydroquinone, methylhydroquinone, butylhydroquinone, dimethylhydroquinone, octylhydroquinone and the like; and the monoalkyl ethers of hydroquinone containing up to 8 carbon atoms in the alkyl group, such as p-methoxyphenol, 2 - methyl - p - methoxyphenol, p - butoxyphenol, p-hexoxyphenol, p-octoxyphenol and the like. The preferred stabilizer is 4-tertiary butylcatechol.

The stabilizing effect was determined by means of an accelerated aging test. In this test a measured amount of the stabilizer was added to the alkylidenebicycloheptene and the mixture was then stored at a selected elevated temperature. At regular intervals portions of each sample were removed and the gum or polymer content was determined by evaporation of the alkylidenebicycloheptene at reduced pressure and elevated temperature. The residual gum was then weighed.

The following data shows the utility of this invention and illustrates the stabilizing effect of 4-tertiary butylcatechol at 50° C.; parts are by weight. The starting material was distilled 5-ethylidenebicyclo[2.2.1]hept-2-ene having an initial gum content of 0.04 weight percent. The stabilizer was added at the concentrations indicated and the containers were sealed and stored at 50° C.

| Stabilize concentration, p.p.m. | Gum content, weight percent | | | |
|---|---|---|---|---|
| | 1 week | 2 weeks | 3 weeks | 4 weeks |
| 0—control | 0.36 | 0.46 | 0.53 | 0.53 |
| 50 | 0.10 | 0.14 | 0.49 | 0.49 |
| 100 | 0.06 | 0.09 | 0.11 | 0.26 |
| 250 | 0.04 | 0.08 | 0.11 | 0.12 |

In similar manner 5-propylidenebicyclo[2.2.1]hept-2-ene is stabilized with 4-tertiary butylcatechol.

As the data shows, as little as 100 p.p.m. of the stabilizer exerts a strong stabilizing effect even after four weeks of aging. A lesser quantity, 50 p.p.m., is effective for a period of less than three weeks of accelerated aging.

A further sample of 5-ethylidenebicyclo[2.2.1]hept-2-ene was stabilized with 100 p.p.m. of the stabilizers indicated below. The samples were stored in a glass bottle, and each bottle was opened to the atmosphere for five minutes three times per day, recapped and shaken. The containers were maintained at 50° C.

| Stabilizer | Gum content, weight percent | | | |
|---|---|---|---|---|
| | 1 week | 2 weeks | 3 weeks | 4 weeks |
| None | 1.7 | 3.9 | 5.7 | 7.1 |
| di-t-butyl-p-cresol | 1.1 | 3.7 | 5.3 | 7.0 |
| Tertiary butylcatechol | 0.85 | 0.93 | 1.4 | 3.3 |
| Ditertiary butylcatechol | 0.25 | 0.30 | 0.43 | 0.36 |

It can be seen that the catechols are effective stabilizers whereas the di-t-butyl-p-cresol, a conventional known stabilizer, is not effective.

At 40° C. and a concentration of 100 p.p.m. of stabilizer the following results were obtained on 5-ethylidenebicyclo[2.2.1]hept-2-ene, with the stabilizers of this invention.

| Stabilizer | Gum content, weight percent | | |
|---|---|---|---|
| | 5 days | 9 days | 14 days |
| None | 1.26 | 2.37 | 3.30 |
| Tertiary butylcatechol | 0.41 | 0.42 | 1.48 |
| Hydroquinone | 0.38 | 0.41 | 0.44 |
| p-Methoxyphenol | 0.38 | 0.50 | 0.47 |

Some other conventional stabilizers were tried and discarded because they caused color development in the alkylidenebicycloheptene; these included phenothiazine, n-butyl-p-aminophenol and N,N'-di-sec.butyl-p-phenylene diamine.

What is claimed is:

1. A composition of matter comprising an alkylidenebicycloheptene and a minor amount of a stabilizer selected from the group consisting of the alkylcatechols having from 1 to 8 carbon atoms in the alkyl chain, the hydroquinones containing up to 8 carbon atoms in the alkyl group, and the monoalkyl ethers of hydroquinone containing up to 8 carbon atoms in the alkyl chain of the ether group, said minor amount being sufficient to stabilize said alkylidenebicycloheptene.

2. A composition of matter as claimed in claim 1, wherein the stabilizer is an alkylcatechol as therein defined and the alkylidenebicycloheptene is 5-ethylidenebicyclo[2.2.1]hept-2-ene.

3. A composition of matter as claimed in claim 1, wherein the stabilizer is a hydroquinone as therein defined and the alkylidenebicycloheptene is 5-ethylidenebicyclo[2.2.1]hept-2-ene.

4. A composition of matter as claimed in claim 1, wherein the stabilizer is a monoalkyl ether of hydroquinone as therein defined and the alkylidenebicycloheptene is 5-ethylidenebicyclo[2.2.1]hept-2-ene.

5. A composition of matter as claimed in claim 1, wherein the concentration of stabilizer is from about 50 p.p.m. to about 2,500 p.p.m. by weight.

6. A composition of matter as claimed in claim 2, wherein the concentration of stabilizer is from about 100 p.p.m. to about 500 p.p.m. by weight.

7. A composition of matter as claimed in claim 2, wherein the stabilizer is 4-tertiary butylcatechol and it is present at a concentration of from about 100 p.p.m. to about 250 p.p.m.

8. A composition of matter as claimed in claim 3, wherein the stabilizer is hydroquinone and it is present at a concentration of from about 100 p.p.m. to about 250 p.p.m.

9. A composition of matter as claimed in claim 4 wherein the stabilizer is p-methoxyphenol and it is present at a concentration of from about 100 p.p.m. to about 250 p.p.m.

References Cited

UNITED STATES PATENTS

| 2,402,113 | 6/1946 | Hatch et al. | 260—666.5 |
| 2,557,684 | 6/1951 | Powers | 260—666.5 X |
| 2,561,915 | 7/1951 | Erickson | 260—666.5 X |
| 2,679,459 | 5/1954 | Rosenwald | 260—666.5 X |
| 2,831,817 | 4/1958 | Ecke et al. | 260—666.5 X |
| 2,561,916 | 7/1951 | Erickson | 260—666.5 X |

DELBERT E. GANTZ, *Primary Examiner.*

G. E. SCHMITKONS, *Assistant Examiner.*